United States Patent
Tabata et al.

(10) Patent No.: US 10,898,791 B2
(45) Date of Patent: Jan. 26, 2021

(54) GAME APPARATUS

(71) Applicant: SQUARE ENIX CO., LTD., Tokyo (JP)

(72) Inventors: Hajime Tabata, Tokyo (JP); Kenichiro Yuji, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/396,263

(22) Filed: Apr. 26, 2019

(65) Prior Publication Data

US 2019/0247745 A1     Aug. 15, 2019

Related U.S. Application Data

(63) Continuation of application No. 15/597,568, filed on May 17, 2017, now Pat. No. 10,315,104, which is a
(Continued)

(30) Foreign Application Priority Data

Oct. 11, 2012  (JP) .................................. 2012-226258

(51) Int. Cl.
*A63F 13/00*     (2014.01)
*A63F 13/56*     (2014.01)
(Continued)

(52) U.S. Cl.
CPC .............. *A63F 13/00* (2013.01); *A63F 13/10* (2013.01); *A63F 13/22* (2014.09); *A63F 13/422* (2014.09);
(Continued)

(58) Field of Classification Search
CPC ........ A63F 13/00; A63F 13/22; A63F 13/422; A63F 13/56; A63F 13/822; A63F 13/10
See application file for complete search history.

(56) References Cited

U.S. PATENT DOCUMENTS 6,210,273 B1   4/2001  Matsuno
6,729,954 B2   5/2004  Atsumi et al.
(Continued)

FOREIGN PATENT DOCUMENTS

JP   61-16777    1/1986
JP   08-182860   7/1996
(Continued)

OTHER PUBLICATIONS

Office Action from Japan Patent Office (JPO) in Japanese Patent Application No. 2012-226258, dated Jan. 28, 2014, together with a partial English language translation thereof.
(Continued)

*Primary Examiner* — Omkar A Deodhar
*Assistant Examiner* — Shauna-Kay Hall
(74) *Attorney, Agent, or Firm* — Greenblum & Bernstein, P.L.C.

(57) ABSTRACT

A game apparatus can cast various attacks only by pressing a same operating button without performing any complex operation. Attack methods are each provided with a priority, and also may be provided with a positional condition regarding a positional relationship between a player character and an enemy character, for executing an attack on the enemy character by the player character. For example, the positional condition is "less than 3 m from player character" and the attack method is "close attack with ax." Since the positional condition "less than 3 m from player character" is given priority over an attack according to the positional condition "3 m or more and less than 10 m from player character," when an attack operation instruction is received, the player character does an attack with an ax on the enemy character present at a distance of less than 3 m.

20 Claims, 9 Drawing Sheets

Related U.S. Application Data continuation of application No. 14/048,227, filed on Oct. 8, 2013, now Pat. No. 9,675,872.

(51) Int. Cl.

| | | |
|---|---|---|
| *A63F 13/822* | (2014.01) | |
| *A63F 13/40* | (2014.01) | |
| *A63F 13/422* | (2014.01) | |
| *A63F 13/833* | (2014.01) | |
| *A63F 13/22* | (2014.01) | |

(52) U.S. Cl.
CPC ............ *A63F 13/56* (2014.09); *A63F 13/822* (2014.09); *A63F 13/833* (2014.09)

(56) References Cited

U.S. PATENT DOCUMENTS

| | | |
|---|---|---|
| 7,137,891 B2 | 11/2006 | Neveu et al. |
| 2001/0029202 A1 | 10/2001 | Kondo et al. |
| 2002/0060427 A1 | 5/2002 | Hinami |
| 2004/0192424 A1 | 9/2004 | Mori et al. |
| 2004/0209680 A1 | 10/2004 | Oyamada et al. |
| 2007/0060234 A1 | 3/2007 | Yamada et al. |
| 2007/0066392 A1 | 3/2007 | Itou |
| 2007/0155501 A1 | 7/2007 | Kanemori et al. |
| 2007/0202936 A1* | 8/2007 | Ishii .................... A63F 13/577 463/8 |
| 2007/0213107 A1 | 9/2007 | Itou et al. |
| 2008/0076569 A1 | 3/2008 | Tabata |
| 2008/0318654 A1 | 12/2008 | Langridge et al. |
| 2010/0069152 A1 | 3/2010 | Nishimura et al. |
| 2011/0092284 A1* | 4/2011 | Kando .................... A63F 13/56 463/31 |

FOREIGN PATENT DOCUMENTS

| | | |
|---|---|---|
| JP | 2008-229290 | 10/2008 |
| JP | 2010-051736 | 3/2010 |
| JP | 2010-088674 | 4/2010 |
| JP | 2010-142346 | 7/2010 |
| JP | 2010-530285 | 9/2010 |
| JP | 2011-101764 | 5/2011 |

OTHER PUBLICATIONS

"Killzone 3", Weekly Fami-tsuu, Feb. 17, 2011, pp. 148-151, together with a partial English language translation thereof.

"BLAZBLU Continuum Shift II", SoftBank Creative, May 1, 2011, pp. 10-13, together with a partial English language translation thereof.

Office Action from Japan Patent Office (JPO) in Japanese Patent Appl. No. 2017-159812, dated Jul. 24, 2018, together with an English language translation.

Office Action from Intellectual Property India in Indian Pat. Appl. No. 4612/CHE/2013, dated Sep. 2, 2020.

* cited by examiner

FIG. 4

| POSITIONAL CONDITION LIST |
| --- |
| CONTACT WITH PLAYER CHARACTER |
| LESS THAN 3 m FROM PLAYER CHARACTER |
| 3 m OR MORE AND LESS THAN 10 m FROM PLAYER CHARACTER |
| 10 m OR MORE FROM PLAYER CHARACTER |
| NEAREST FROM PLAYER CHARACTER |
| FARTHEST FROM PLAYER CHARACTER |
| CONTACT WITH ALLY PLAYER CHARACTER |
| LESS THAN 3 m FROM ALLY PLAYER CHARACTER |
| 3 m OR MORE AND LESS THAN 10 m FROM ALLY PLAYER CHARACTER |
| 10 m OR MORE FROM ALLY PLAYER CHARACTER |
| CONTACT WITH PLAYER CHARACTER WITH LOWEST HP |
| LESS THAN 3 m FROM PLAYER CHARACTER WITH LOWEST HP |
| 3 m OR MORE AND LESS THAN 10 m FROM PLAYER CHARACTER WITH LOWEST HP |
| 10 m OR MORE FROM PLAYER CHARACTER WITH LOWEST HP |

*FIG. 5*

| ATTACK METHOD LIST |
| --- |
| CLOSE ATTACK WITH SWORD |
| CLOSE ATTACK WITH AX |
| CLOSE ATTACK WITH HAMMER |
| THROW A |
| THROW B |
| DISTANT ATTACK WITH BOW |
| DISTANT ATTACK WITH BOOMERANG |
| DISTANT ATTACK WITH GUN |
| ATTACK SPELL A |
| ATTACK SPELL B |
| SKILL A |
| SKILL B |
| COOPERATION ATTACK A |
| COOPERATION ATTACK B |

FIG. 6

| POSITIONAL CONDITION | ATTACK METHOD | PRIORITIES |
|---|---|---|
| CONTACT WITH PLAYER CHARACTER | THROW A | 1 |
| LESS THAN 3 m FROM PLAYER CHARACTER | CLOSE ATTACK WITH AX | 2 |
| 3 m OR MORE AND LESS THAN 10 m FROM PLAYER CHARACTER | DISTANT ATTACK WITH BOOMERANG | 3 |

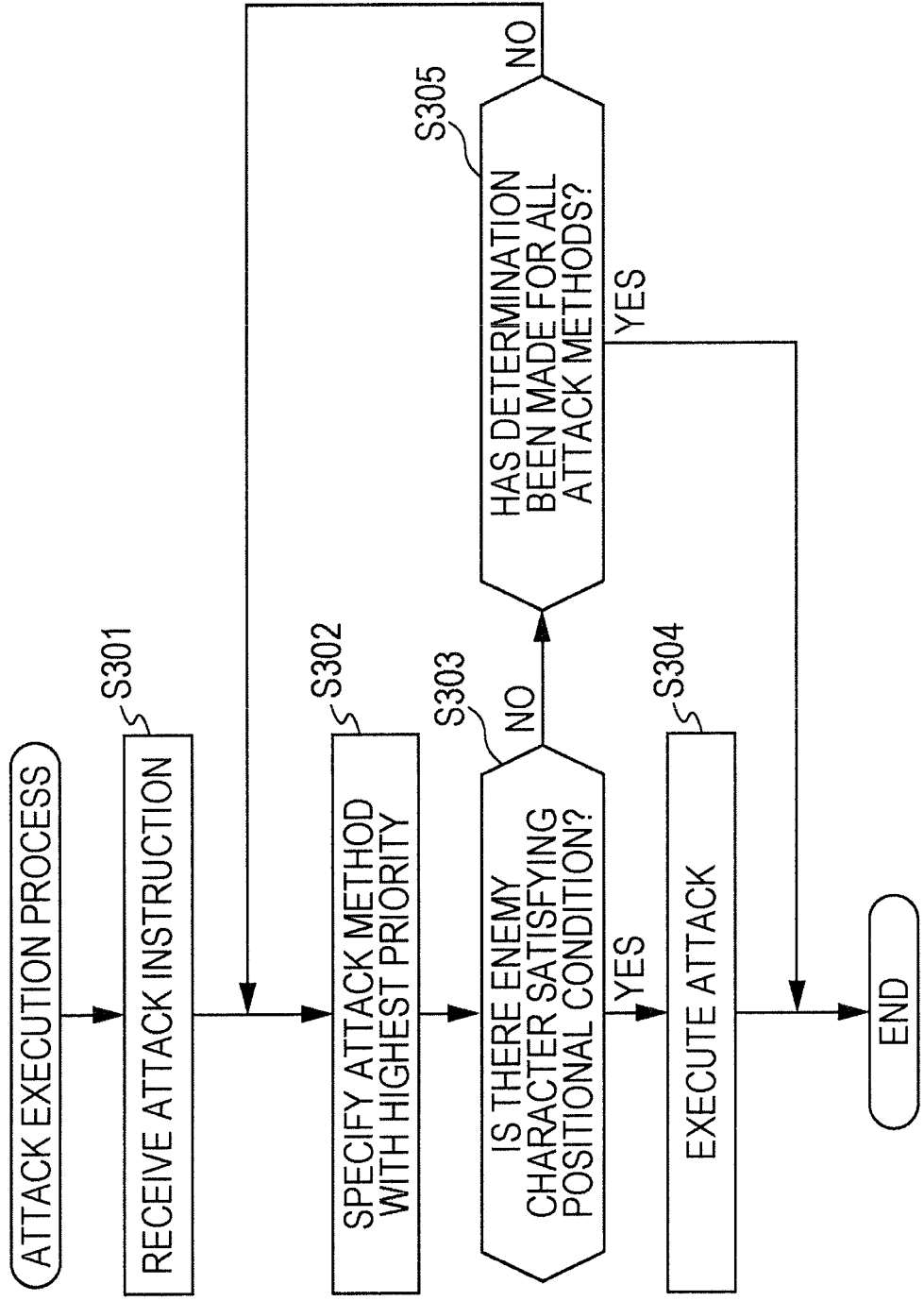

GAME APPARATUS

CROSS REFERENCE TO RELATED APPLICATION

This is a continuation application of U.S. patent application Ser. No. 15/597,568, filed May 17, 2017, which is a continuation application of U.S. patent application Ser. No. 14/048,227, filed Oct. 8, 2013 and now U.S. Pat. No. 9,675,872 issued Jun. 13, 2017, which claims the benefit of Japanese Patent Application No. 2012-226258, filed on Oct. 11, 2012. The entire disclosure of each of the above-identified applications, including the specification, drawings, and claims, is incorporated herein by reference in its entirety.

TECHNICAL FIELD

The present invention relates to a game apparatus capable of strategically casting various types of attacks in a battle between a player character and an enemy character, without a player performing any complex operation.

BACKGROUND ART

In a conventional RPG it is common that when a player character attacks an enemy character, a player selects his/her desired command from a plurality of commands to specify what kind of attack is made on the enemy character (see, for example, JP 2010-142346 A). In addition, in an action game and an action RPG specification of what kind of attack is made on an enemy character is performed by pressing any of a plurality of operating buttons. As such, in order to enhance the interest of a game, the types of attacks that can be taken when a player character attacks an enemy character have been diversified.

However, in the case of an RPG, as the number of types of attacks that can be taken upon an attack increases, the player needs to search and select his/her desired command from a larger number of commands. Thus, the player needs to press operating buttons a number of times, and as a result, it takes time to select a command. In addition, in the case of an action game and an action RPG, a complex operation is required, such as pressing a plurality of different operating buttons simultaneously or continuously. Hence, the game is difficult for a beginner of the game to get accustomed to, e.g., he/she cannot fully enjoy the game until mastering the game.

SUMMARY OF INVENTION

Technical Problem

The present invention is made to solve such problems, and an object of the present invention is to provide a game apparatus capable of casting various attacks only by pressing the same operating button without performing any complex operation.

Solution to Problem

The present invention relates to a game apparatus including a display device and an input device, the game apparatus progressing a game in which a player character does a virtual battle with an enemy character, the player character being a player's operation target, the game apparatus comprising: an attack method storage that stores an attack method performed on the enemy character by the player character and a positional condition regarding a positional relationship between the player character and the enemy character such that the attack method and the positional condition are associated with each other; an attack instruction receptor that receives an attack instruction by a player providing an operation instruction to the input device; an attack method specifier that specifies, when receiving the attack instruction by the attack instruction receptor, an attack method associated with a positional relationship between the player character and the enemy character, based on the attack method stored in the attack method storage, the positional relationship being obtained upon receiving the attack instruction by the attack instruction receptor; and an attack executor that executes an attack on the enemy character by the player character, according to the attack method specified by the attack method specifier.

An attack method performed on an enemy character by a player character and a positional condition regarding the positional relationship between the player character and the enemy character are set in advance so as to be associated with each other. Thus, an attack method can be changed according to the position of the enemy character with respect to the player character, without changing a player's operation method. Even if the player pressing the same operating button, various attacks can be made according to the positional relationship such as the distance between the player character and the enemy character and the directions of the player character and the enemy character, e.g., a normal attack with a hit is made for a close distance between the player character and the enemy character, an attack with a spell is made for an intermediate distance, and an indirect attack with a bow, a boomerang, or a gun is made for a far distance. Hence, even a beginner of the game can easily cast various attacks.

In addition, an attack can be executed by the player adjusting the positional relationship between the player character and the enemy character so as to obtain an attack method that the player wants the player character to perform. The player can strategically change the attack method against the enemy character by changing the position of the player character, taking into account the game progressing status such as the strength or type of the enemy character, the number of enemy characters, or the remaining physical strength of the player character. Thus, the player can enjoy a game with further enhanced interest.

In the present invention, it is preferable that the game apparatus comprising: a setting instruction receptor that receives an instruction to set a positional condition and an attack method, according to an operation instruction provided to the input device by the player; and an attack method updater that updates the positional condition and attack method stored in the attack method storage, according to the instruction to set a positional condition and an attack method received by the setting instruction receptor.

The player can set which attack method to use at how much distance between the player character and the enemy character. Therefore, the player can strategically set a positional condition and an attack method, taking into account the game progressing status such as the strength or type of the enemy character, the number of enemy characters, or the remaining physical strength of the player character, enabling to enhance the interest of the game.

In the present invention, it is preferable that the attack method storage can store a plurality of different attack methods, and stores different positional conditions for the different attack methods such that the attack methods are associated with the positional conditions, respectively, and further stores priorities for the attack methods, the priorities being for specifying an attack method performed on a priority basis from among the plurality of attack methods, and the attack method specifier specifies an attack method capable of executing an attack on the enemy character by the player character and having a highest priority, based on the attack methods and priorities stored in the attack method storage.

For example, when a plurality of enemy characters are present around the player character, priorities can be set taking into account, for example, an enemy character of which positional condition is attacked on a priority basis or which attack method is performed on a priority basis. Thus, the player can strategically advance a battle with the enemy characters, enhancing the interest of the game.

The present invention relates to a game progressing method for a game in which a player character does a virtual battle with an enemy character, the player character being a player's operation target, the method comprising the steps of: storing, in a storage, an attack method performed on the enemy character by the player character and a positional condition regarding a positional relationship between the player character and the enemy character such that the attack method and the positional condition are associated with each other; receiving an attack instruction by a player providing an operation instruction to an input device; specifying, when receiving the attack instruction, an attack method associated with a positional relationship between the player character and the enemy character, based on the attack method associated with the positional condition stored in the storage, the positional relationship being obtained upon receiving the attack instruction; and executing an attack on the enemy character by the player character, according to the specified attack method.

The present invention relates to a computer-readable recording medium storing a game program that causes a computer apparatus to execute a game in which a player character does a virtual battle with an enemy character, the player character being a player's operation target, the game program causing the computer apparatus to function as: an attack method storage that stores an attack method performed on the enemy character by the player character and a positional condition regarding a positional relationship between the player character and the enemy character such that the attack method and the positional condition are associated with each other; an attack instruction receptor that receives an attack instruction by a player providing an operation instruction to an input device; an attack method specifier that specifies, when receiving the attack instruction by the attack instruction receptor, an attack method associated with a positional relationship between the player character and the enemy character, based on the attack method associated with the positional condition stored in the attack method storage, the positional relationship being obtained upon receiving the attack instruction by the attack instruction receptor; and an attack executor that executes an attack on the enemy character by the player character, according to the attack method specified by the attack method specifier.

BRIEF DESCRIPTION OF THE DRAWINGS

FIG. 4 is a diagram showing an example of a positional condition list according to an embodiment of the present invention;

FIG. 5 is a diagram showing an example of an attack method list according to an embodiment of the present invention;

FIG. 6 is a diagram showing an example of an attack method management table according to an embodiment of the present invention;

FIG. 9 is a diagram showing an example of a flowchart of an attack execution process according to an embodiment of the present invention.

DESCRIPTION OF EMBODIMENTS

Figure 1:
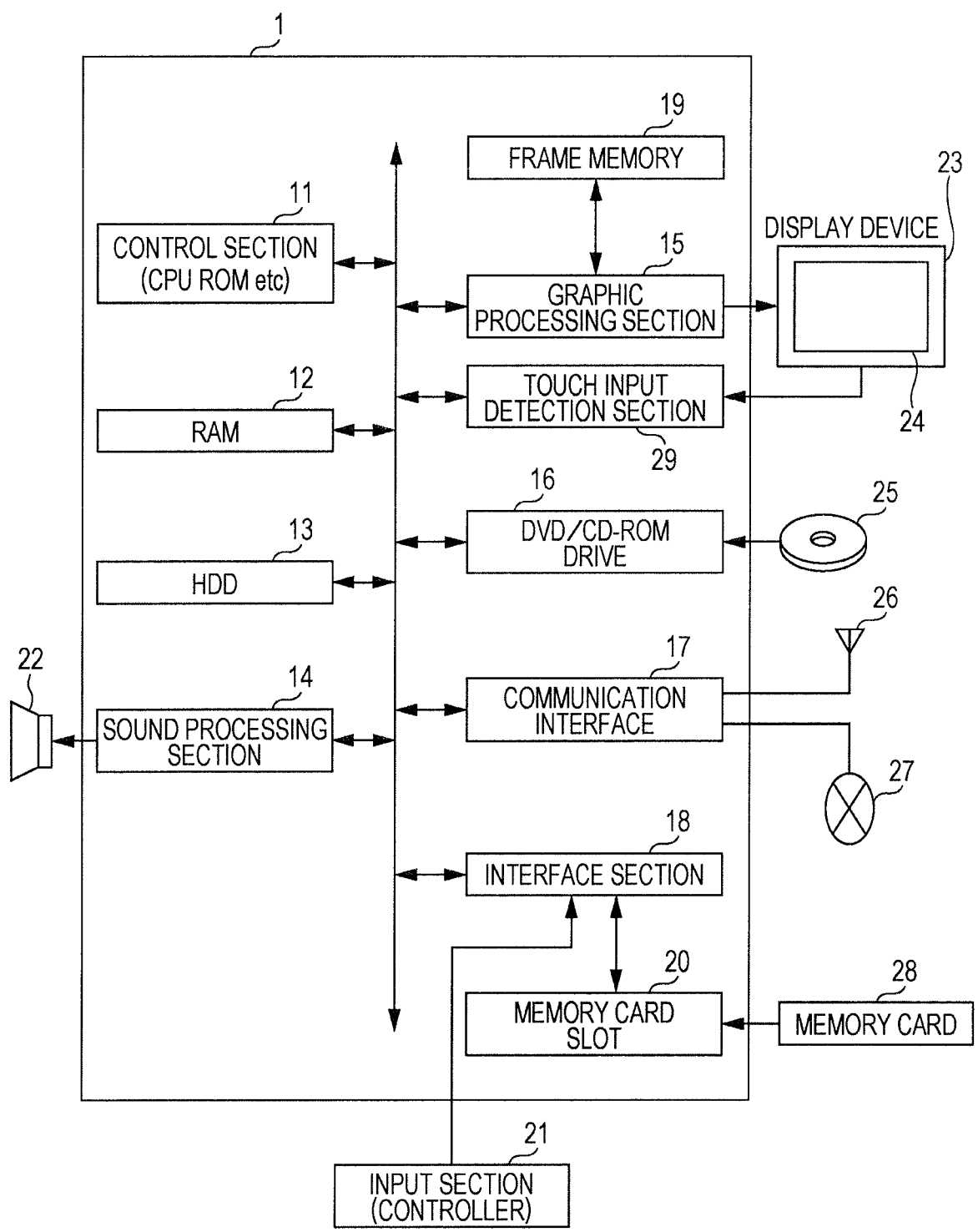
FIG. 1 is a block diagram showing a configuration of a game apparatus according to an embodiment of the present invention.

An embodiment of the present invention will be described below with reference to the accompanying drawings. FIG. 1 is a block diagram showing a configuration of a game apparatus for executing a video game, according to an embodiment of the present invention. The game apparatus is mainly configured of an apparatus main body 1. The apparatus main body 1 includes a control section 11, a RAM (Random Access Memory) 12, a hard disk drive (HDD) 13, a sound processing section 14, a graphic processing section 15, a DVD/CD-ROM drive 16, a communication interface 17, an interface section 18, and a touch input detection section 29. Those components are connected to each other by an internal bus.

The control section 11 is composed of a CPU (Central Processing Unit) and a ROM (Read Only Memory), and executes a program stored in the HDD 13 or a recording medium 25 and thereby controls the apparatus main body 1. In addition, the control section 11 includes an internal timer. The RAM 12 is a working area of the control section 11. The HDD 13 is a storage area for saving programs and data.

The DVD/CD-ROM drive 16 can allow the recording medium 25 having stored therein a game program, such as a DVD-ROM or a CD-ROM, to be placed therein. A program and data that are used to perform a game on the video game apparatus are stored in the recording medium 25. The program and the data are read by the DVD/CD-ROM drive 16 and then are loaded into the RAM 12.

The control section 11 performs a process by reading data necessary for a game in progress from the RAM 12. However, since the RAM 12 has smaller storage capacity than the HDD 13 and the recording medium 25, only necessary data is loaded into the RAM 12 from the recording medium 25, according to the game progressing status. The control section 11 processes the program and data loaded into the RAM 12, and outputs a sound output instruction to the sound processing section 14 and outputs a rendering instruction to the graphic processing section 15.

The sound processing section 14 is connected to a sound output device 22 which is a speaker. When the control section 11 outputs a sound output instruction to the sound processing section 14, the sound processing section 14 outputs a sound signal to the sound output device 22.

The graphic processing section 15 is connected to a display device 23 having a display screen 24. When a rendering instruction is output from the control section 11, the graphic processing section 15 expands images in a frame memory (frame buffer) 19 and outputs a video signal for displaying the images on the display screen 24 of the display device 23. One frame time of an image included in the video signal output from the graphic processing section 15 is, for example, 1/30 second. The graphic processing section 15 performs rendering of a single image in units of frames (i.e., in units of 1/30 second).

An input section (controller) 21 and a memory card slot 20 are connected to the interface section 18. The input section 21 includes direction keys and a plurality of operating buttons. A player character is allowed to move by direction key operations. Input information from the input section 21 based on an operation performed on a keypad by the player is stored in the RAM 12, and the control section 11 performs various types of arithmetic processings based on the input information. The interface section 18 performs, according to an instruction from the control section 11, the process of allowing a memory card 28 placed in the memory card slot 20 to save data indicating a game progressing status stored in the RAM 12, and reading game data obtained at the time of suspension which is saved in the memory card 28 and transferring the game data to the RAM 12.

The communication interface 17 is connected by wire or wireless to a communication network 27. In addition, the communication interface 17 can perform wireless communication with other video game apparatuses through a communication unit having an antenna 26.

The display screen 24 may be of a touch panel type. When the surface of a touch panel is touched with a finger or touch pen, the touch position can be detected by the touch input detection section 29. Input information from the touch input detection section 29 is stored in the RAM 12, and the control section 11 performs various types of arithmetic processings based on the input information.

Figure 2:
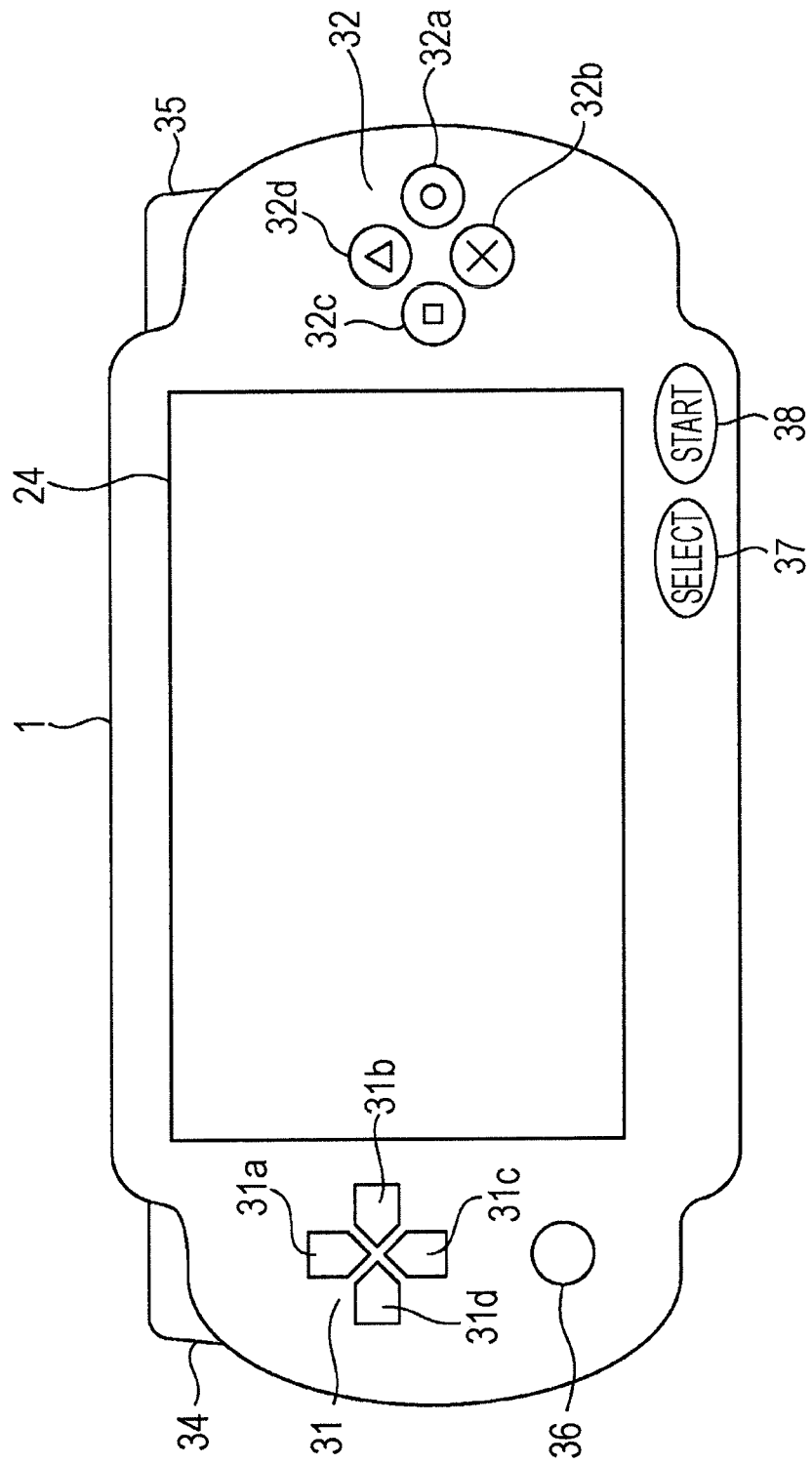
FIG. 2 is a diagram showing an example of an external view of the game apparatus according to an embodiment of the present invention.

FIG. 2 shows an example of an external view of the apparatus main body 1 according to an embodiment of the present invention. The input section 21 and the display device 23 may be configured integrally with the apparatus main body 1 or may be provided separately from the apparatus main body 1, and FIG. 2 shows the integral configuration.

A cross key (D-pad) 31 is provided on the left front of the apparatus main body 1, and a button group 32 is provided on the right front. The cross key 31 includes an up key 31a, a right key 31b, a down key 31c, and a left key 31d. The button group 32 includes a ○ ('Circle/○') button 32a, a x ('Cross/X') button 32b, a □ ('Square') button 32c, and a Δ ('Triangle') button 32d. In addition, the display screen 24 is provided at a central portion of the apparatus main body 1, and a select button 37 and a start button 38 are provided below the display screen 24. Furthermore, a plurality of buttons such as an R button 34 and an L button 35 are provided on side portions of the apparatus main body 1. In addition, a joystick 36 is provided on the left front of the apparatus main body 1 and below the cross key 31.

When a pressing force is applied to each of the cross key 31, the ○ button 32a, the x button 32b, the □ button 32c, the Δ button 32d, the select button 37, the start button 38, the R button 34, and the L button 35, a corresponding switch is turned on. A detection signal according to the on/off of the switch is generated by the input section 21. In addition, a detection signal corresponding to the tilt orientation of the joystick 36 is generated by the input section 21.

A switch system detection signal generated by the input section 21 is supplied to the interface section 18 and serves as detection information indicating which button has been turned on. As for the joystick 36, a joystick system detection signal serves as detection information indicating the state of the joystick 36. In this manner, operation instructions provided to the input section 21 by the player are supplied to the apparatus main body 1.

A summary of the game apparatus according to the present invention will be described. In the present invention, when one of the operating buttons of the input section 21 that is assigned to execute an attack on an enemy character by a player character (hereinafter, also referred to as the attack button), e.g., the 0 button 32a, is pressed, the attack method changes according to the positional relationship such as the distance between the player character and the enemy character and the directions of the player character and the enemy character. A plurality of conditions regarding the positional relationship between the player character and the enemy character (hereinafter, also referred to as the positional conditions) and a plurality of attack methods according to the positional conditions are set in advance. An attack method to be performed by the player character is specified according to which positional condition is satisfied by the positional relationship between the player character and the enemy character when the player presses the attack button of the input section 21.

Note that in the present invention the concept of "player character" includes a character acting as an ally of the player character by AI control, as well as a character that can be operated by the player using the input section 21. In addition, in the case of a multiplayer game such as an MMORPG, the concept of "player character" in the present invention includes player characters operated by other players, as well as a player character operated by the player.

In the present invention, for example, aside from a battle screen where a player character and an enemy character do a virtual battle, an attack method setting screen may be provided where a positional condition and an attack method according to the positional condition can be set by a player's operation. Before doing a battle with an enemy character or during a battle with an enemy character, the player can arbitrarily change the setting of an attack method according to the game progressing status, etc., by switching from a battle screen to an attack method setting screen.

Figure 3:
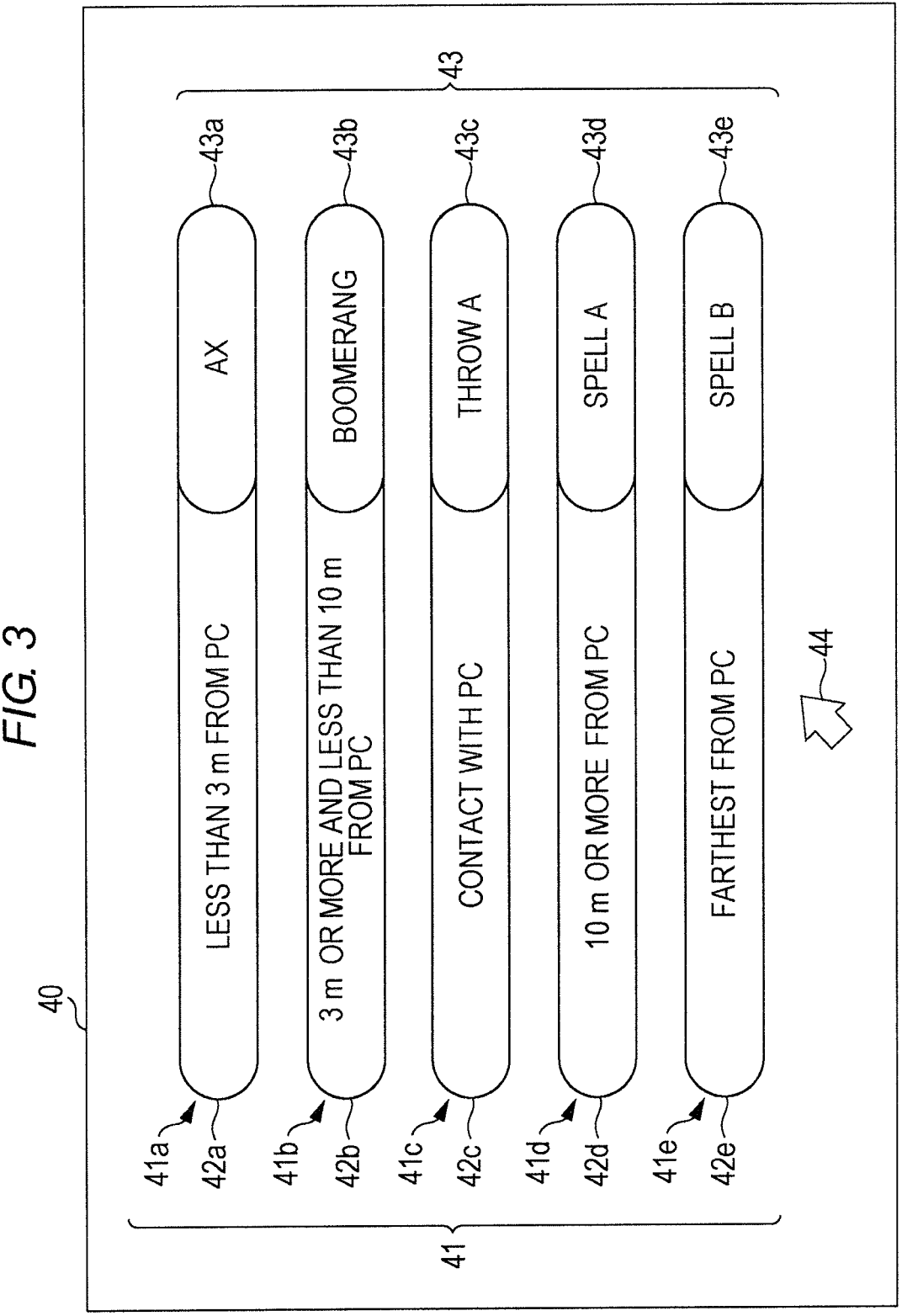
FIG. 3 is a diagram showing an example of an attack method setting screen according to an embodiment of the present invention.

FIG. 3 shows an example of an attack method setting screen displayed on the display screen of the game apparatus according to an embodiment of the present invention. In an attack method setting screen 40, a plurality of attack method setting panels 41a to 41e are displayed arranged in a line in a vertical direction. An attack method setting panel 41 is provided with a positional condition display area 42 that displays a positional condition regarding the positional relationship between a player character and an enemy character, and an attack method display area 43 that displays an attack method performed on the enemy character by the player character.

Each attack method setting panel 41 is provided with one positional condition display area 42 and one attack method display area 43 in a pair. The positional condition display area 42 displays a positional condition, and the attack method display area 43 displays an attack method associated with the positional condition displayed in the positional condition display area 42 in the same attack method setting panel 41. That is, there is a correspondence between the positional condition displayed in the positional condition display area 42 and the attack method displayed in the attack method display area 43 which are present in the same attack method setting panel 41.

For example, in the case in which the positional condition displayed in a positional condition display area 42a in the attack method setting panel 41a is "less than 3 m from player character" and the attack method displayed in an attack method display area 43a is a "close attack with ax", when the player provides an attack operation instruction to the input section 21, an attack with an ax is done on an enemy character present less than 3 m from the player character.

When the player moves a cursor 44 onto a positional condition display area 42 by providing an operation instruction to the input section 21, and selects the positional condition display area 42, a positional condition list is displayed in a pull-down menu format. In the positional condition list, for example, as shown in FIG. 4, a list of various positional conditions such as "contact with player character", "less than 3 m from player character", and "3 m or more and less than 10 m from player character" is pre-registered. The player can select a positional condition he/she wants to set from the displayed positional condition list, by providing an operation instruction to the input section 21.

For the positional conditions registered in the positional condition list, some of them may be registered by default at the start of the game, or the player character may gain a positional condition according to the progress of the game and register the positional condition in the positional condition list. For example, when the player character clears a challenge given during the progress of the game, a positional condition that is newly registered in the positional condition list can be added.

When the player moves the cursor 44 onto an attack method display area 43 by providing an operation instruction to the input section 21 and selects the attack method display area 43, an attack method list is displayed in a pull-down menu format. In the attack method list, for example, as shown in FIG. 5, a list of various attack methods such as "close attack with ax", "distant attack with boomerang", and "distant attack with gun" is pre-registered. The player can select an attack method he/she wants to set from the displayed attack method list, by providing an operation instruction to the input section 21.

For the attack methods registered in the attack method list, some of them may be registered by default at the start of the game, or the player character may gain an attack method according to the progress of the game and register the attack method in the attack method list. For example, when the player character's level has reached a certain level, when the player character has learnt a predetermined spell or skill, or when the player character is equipped with a predetermined item, an attack method that is newly registered in the attack method list can be added.

Note that restrictions may be placed on candidate attack methods displayed in the attack method list so that only predetermined candidates according to an associated positional condition can be displayed. For example, when the positional condition displayed in a positional condition display area 42 is "contact with player character", candidate attack methods that are displayed by selecting a corresponding attack method display area 43 are restricted to a close attack with a sword, etc., throws, and the like, so that distant attacks with a bow, a boomerang, etc., cannot be selected. In addition, when the positional condition displayed in a positional condition display area 42 is "10 m or more from player character", candidate attack methods that are displayed by selecting a corresponding attack method display area 43 are restricted to distant attacks with a bow, a boomerang, etc., so that close attacks or throws cannot be selected. Therefore, attack methods that can be registered according to a set positional condition as attack methods associated with the positional condition are restricted to predetermined attack methods.

In this case, the range of distance where an attack can be made (attack range) is set for each skill, weapon, and spell used for an attack, and candidate attack methods displayed in the attack method list may be specified according to the distance between the player character and the enemy character.

Priorities may be set for the attack method setting panels 41. For example, the attack method setting panel 41a displayed at the top in the attack method setting screen 40 can be set to the highest priority, and the lower attack method setting panel can be set to the lower priority. The priorities of the attack method setting panels 41 can be changed. By moving the position of an attack method setting panel 41 upward or downward while selecting the attack method setting panel 41, the priority thereof can be changed.

For example, in such case of FIG. 3, since the attack method setting panel 41a is displayed higher in position than the attack method setting panel 41b, an attack according to the positional condition "less than 3 m from player character" set on the attack method setting panel 41a is given priority over an attack according to the positional condition "3 m or more and less than 10 m from player character" set on the attack method setting panel 41b. Therefore, in the case in which enemy characters are present less than 3 m from the player character and present 3 m or more and less than 10 m from the player character, when the attack button is pressed, a "close attack with ax" is executed on the enemy character present less than 3 m from the player character.

The player can move the attack method setting panel 41a to a lower position than the attack method setting panel 41b by operating the input section 21 to select the attack method setting panel 41a and press a downward direction key. In this case, an attack according to the positional condition "3 m or more and less than 10 m from player character" set on the attack method setting panel 41b is given priority over an attack according to the positional condition "less than 3 m from player character" set on the attack method setting panel 41a. Therefore, in the case in which enemy characters are present less than 3 m from the player character and present 3 m or more and less than 10 m from the player character, when the player presses the attack button, a "distant attack with boomerang" is executed on the enemy character present 3 m or more and less than 10 m from the player character.

In addition, even when there are a plurality of enemy characters in a range where the player character can make an attack, the configuration can be made such that priorities are not set to the attack method setting panels 41. For example, on a battle screen, by moving the player's sights by pressing an operating button of the input section 21 (e.g., the R button 34 or the L button 35), an enemy character serving as an attack target can be selected from among a plurality of enemy characters. In this case, a determination is made as to which one of the attack conditions set on the attack method setting panels 41 corresponds to the positional relationship between the enemy character selected as the attack target and the player character, and an attack against the selected enemy character is executed according to an attack method associated with the attack condition determined to correspond.

The number of attack method setting panels 41 is at least one and is preferably plural. The number of attack method setting panels 41 may be freely increased or reduced by a player's operation. In addition, the configuration may be such that a predetermined number is set as an upper limit so that a larger number of attack method setting panels 41 than the predetermined number cannot be set. In this case, the upper limit number of attack method setting panels 41 that can be set may be changed according to the game progressing status. For example, by the player character reaching a predetermined level, or by the player character clearing a predetermined quest, or by the player character gaining a predetermined item, the number of attack method setting panels 41 that can be set can be increased. Therefore, the number of set attack methods that can be set to be associated with positional conditions can be freely increased or reduced, or the number of set attack methods can be increased or reduced according to the game progressing status.

Next, an attack method management table will be described. FIG. 6 shows an example of an attack method management table according to an embodiment of the present invention. An attack method management table 50 stores positional conditions 51 and attack methods 52 set by the player, such that they are associated with each other, and is set in the RAM 12. In addition, if necessary, priorities 53 can be stored so as to be associated with the positional conditions 51 or the attack methods 52.

A positional condition 51 represents a condition as to which position the enemy character is present when viewed from the player character. For example, for the positional condition 51 "contact with player character", an enemy character in contact with the player character satisfies this condition. For the positional condition 51 "less than 3 m from player character", an enemy character present at a distance of less than 3 m from the player character satisfies this condition. In addition, the positional condition 51 may represent not only a condition regarding the distance between the player character and the enemy character, but also a condition regarding in which direction the enemy character is present with respect to the player character, e.g., in the front direction or the back direction.

An attack method 52 is stored so as to be associated with a positional condition. The range of selectable attack methods increases according to the equipment equipped by the player character, the item held by the player character, the skill of the player character, the spell that can be used by the player character, the level of the player character, etc. Only when the player character wins a battle and thereby its level improves and a new skill is obtained, the skill may be able to be selected as an attack method 52. In addition, when the player character buys new equipment using virtual currency and thereby obtains the equipment, an attack using the equipment can be selected as an attack method 52.

Figure 7:
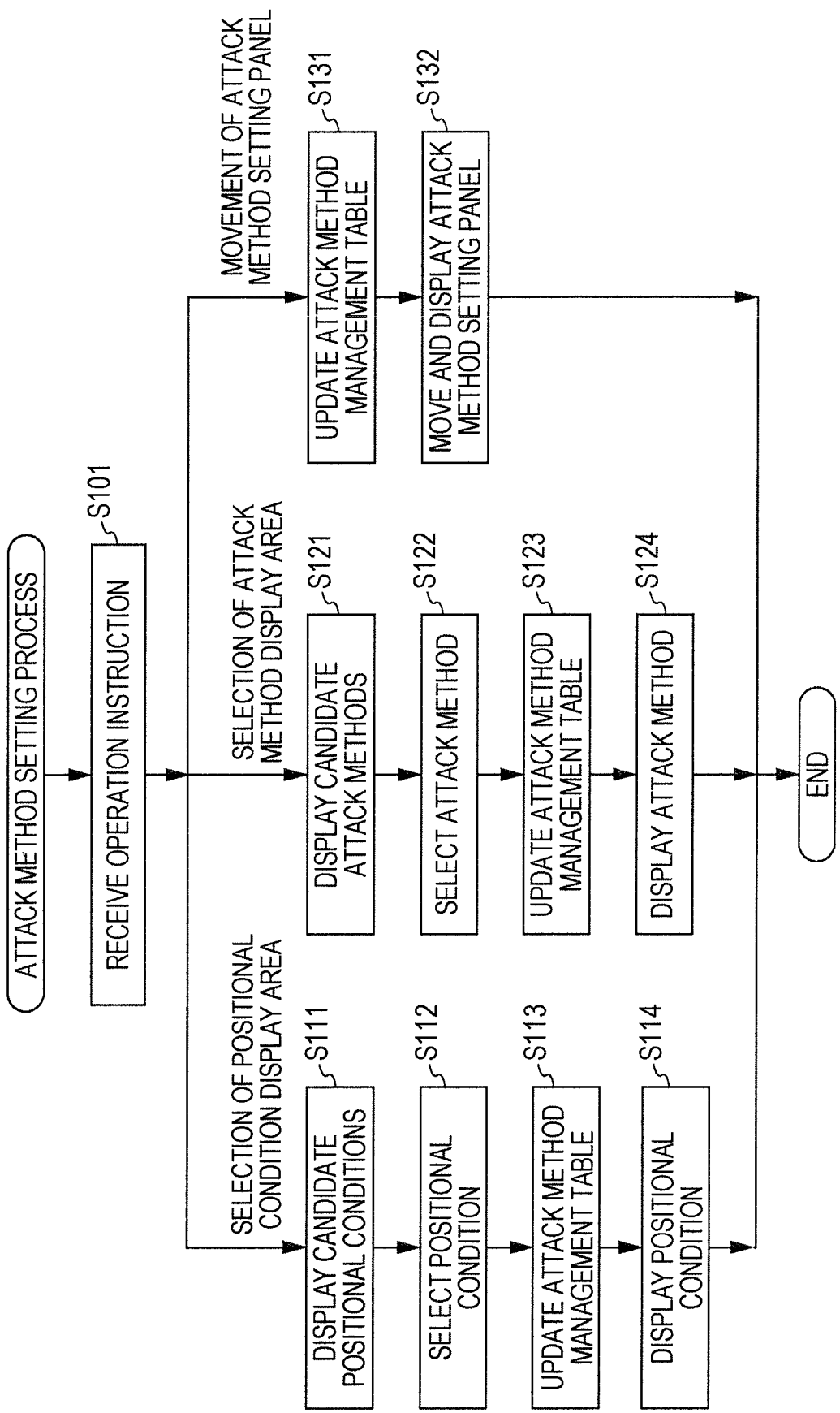
FIG. 7 is a diagram showing an example of a flowchart of an attack method setting process according to an embodiment of the present invention.

Next, an attack method setting process in an attack method setting screen such as that shown in FIG. 3 will be described. FIG. 7 shows an example of a flowchart of an attack method setting process according to an embodiment of the present invention. First, an operation instruction provided to the input section 21 by the player is received by the control section 11 (step S101).

When the operation instruction received at step S101 is to select a positional condition display area 42, candidate positional conditions are displayed in a positional condition list set in the RAM 12 (step S111). Then, when any positional condition is selected from among the plurality of displayed candidate positional conditions by the player providing an operation instruction to the input section 21 (step S112), positional conditions 51 in an attack method management table 50 are updated (step S113). Furthermore, a newly selected positional condition 51 is displayed in the positional condition display area 42 (step S114), by which the attack method setting process ends.

When the operation instruction received at step S101 is to select an attack method display area 43, candidate attack methods are displayed in an attack method list set in the RAM 12 (step S121). Then, when any attack method is selected from among the plurality of displayed candidate attack methods by the player providing an operation instruction to the input section 21 (step S122), attack methods 52 in an attack method management table 50 are updated with a newly selected attack method 52 (step S123). Furthermore, the newly selected attack method 52 is displayed in the attack method display area 43 (step S124), by which the attack method setting process ends.

When the operation instruction received at step S101 is to move an attack method setting panel 41, priorities 53 in an attack method management table 50 are updated (step S131). Furthermore, an attack method setting screen 40 is displayed with the order of attack method setting panels 41 being changed (step S132), and the attack method setting process ends.

Next, the process of attacking an enemy character by a player character will be described. As a first example of the embodiment of the present invention, there is a case in which the player's sights are set on an enemy character serving as an attack target from among a plurality of enemy characters displayed on a battle screen, by pressing the R button 34 or the L button 35 of the input section 21, to specify the enemy character serving as the attack target.

Figure 8:
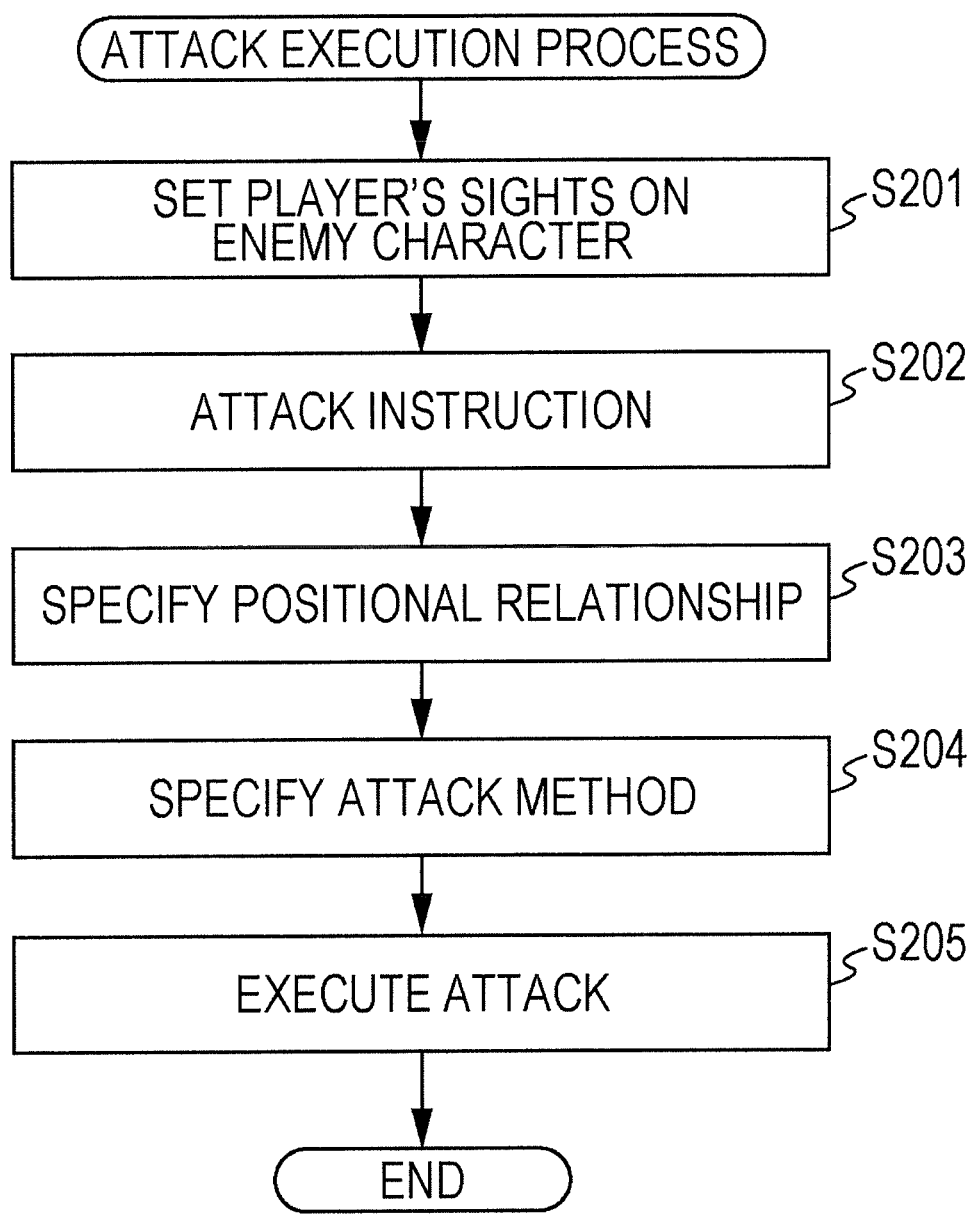
FIG. 8 is a diagram showing an example of a flowchart of an attack execution process according to an embodiment of the present invention.

FIG. 8 shows an example of a flowchart of an attack execution process according to an embodiment of the present invention. By setting the player's sights on an enemy character by the player providing an operation instruction to the input section 21, the enemy character serving as an attack target is specified (step S201). Then, an attack instruction is received by an operation instruction provided to the input section 21 (step S202). When the attack instruction is received, the distance between the player character and the enemy character is calculated, or the direction of the enemy character with respect to the player character, the direction of the player character with respect to the enemy character, or the like, is calculated, by which the positional relationship between the player character and the enemy character is specified (step S203).

Based on the positional relationship between the player character and the enemy character which is specified at step S203, an attack method associated with a positional condition to which the positional relationship between the player character and the enemy character corresponds is specified by referring to the attack method management table 50 (step S204). Then, an attack by the attack method specified at step S204 is executed on the enemy character on which the player's sights are set (step S205), and the attack execution process ends.

As a second example of the embodiment of the present invention, there is a case in which priorities are set in advance for positional conditions or attack methods, and an enemy character serving as an attack target is specified according to the priorities.

FIG. 9 shows an example of a flowchart of an attack execution process according to an embodiment of the present invention. First, an attack instruction is received by the player providing an operation instruction to the input section 21 (step S301). When the attack instruction is received, an attack method with the highest priority is specified by referring to the attack method management table 50 (step S302). Then, a determination is made as to whether there is an enemy character satisfying a positional condition associated with the attack method specified at step S302 (step S303).

If there is an enemy character satisfying the positional condition associated with the specified attack method (YES at step S303), then an attack by the specified attack method is executed on the enemy character (step S304), by which the attack execution process ends.

On the other hand, if there is no enemy character satisfying the positional condition associated with the specified attack method (NO at step S303) and the determination at step S303 has been made for all attack methods (YES at step S305), then the attack button operation is invalid and thus the attack execution process ends without executing an attack by the player character. On the other hand, if the determination at step S303 has not been made for all attack methods (NO at step S305), then processing returns to step S302 and an attack method with the second highest priority is specified by referring to the attack method management table 50. As such, until it is determined at step S303 that there is an enemy character satisfying a positional condition associated with a specified attack method, the processes at steps S302 and S303 are repeated.

Note that the game apparatus according to the present invention can cast various attacks based on the correspondence between positional conditions and attack methods set by the player even when the same operating button is pressed; however, it is also possible, for example, to switch, by a player's operation, between a game mode to which the present invention is applied and in which various attacks can be cast based on the correspondence between positional conditions and attack methods set by the player, and a normal game mode in which various attacks can be cast by the player pressing a plurality of buttons.

Although the above embodiments mainly describe the case in which the present invention is applied to RPGs, game genres are not particularly limited as long as the game is such that a player character attacks an enemy character while moving around the game field. The present invention can be applied to games, e.g., action games, shooting games, and racing games.

REFERENCE SIGNS LIST 1 apparatus main body
11 control section
12 RAM
13 HDD
14 sound processing section
15 graphic processing section
16 DVD/CD-ROM drive
17 communication interface
18 interface section
19 frame memory
20 memory card slot
21 input section
22 sound output device
23 display device
24 display screen
25 recording medium
26 antenna
27 communication network
28 memory card
31 cross key (D-pad)
32 button group
40 attack method setting screen
50 attack method management table

What is claimed is:

1. A game apparatus including a display device and an input device, the game apparatus progressing a game in which a player character does a virtual battle with an enemy character, the player character being an operation target of a player, the game apparatus comprising:
   a memory that stores, for a first game mode, a plurality of attack methods to be performed on the enemy character by the player character and conditions regarding a distance between the player character and the enemy character such that the plurality of attack methods and the conditions are associated with each other;
   the memory that stores, for a second game mode, the plurality of attack methods to be performed on the enemy character by the player character and patterns regarding operation instructions to the input device by the player, the plurality of attack methods being associated with the patterns in the memory;
   an interface that receives an attack instruction by a first operation instruction to the input device by the player;
   a processor that specifies, in the first game mode, when receiving the attack instruction by the interface, a first attack method based on the plurality of attack methods stored in the memory, the first attack method corresponding to the distance between the player character and the enemy character when the attack instruction is received by the interface;
   the processor that specifies, in the second game mode, when receiving the attack instruction by the interface, a second attack method based on the plurality of attack methods stored in the memory, the second attack method corresponding to one of the patterns of the operations to the input device by the player when the attack instruction is received by the interface; and
   the processor that executes an attack on the enemy character by the player character, according to one of, in the first game mode, the first attack method or, in the second game mode, the second attack method of the plurality of attack methods,
   wherein a game mode is configured to be switched between the first game mode and the second game mode by a switching instruction to the input device by the player.

2. The game apparatus according to claim 1, wherein the interface receives, for the first game mode, a setting instruction to set an input attack method and an input condition regarding the distance, according to a second operation instruction provided to the input device by the player; and
   the processor updates, for the first game mode, the plurality of attack methods and the conditions regarding the distance, that are stored in the memory, according to the setting instruction to set the input attack method and the input condition received by the interface.

3. The game apparatus according to claim 1, wherein in the first game mode, each of the plurality of attack methods is performed by the player character, by the player providing a same operation instruction to the input device.

4. The game apparatus according to claim 3, wherein the same operation instruction to the input device includes a single button on the input device being operated.

5. The game apparatus according to claim 1, wherein
the memory stores, for the first game mode, different conditions for different attack methods such that the plurality of attack methods are associated with the conditions, respectively, and further stores, for the first game mode, priorities for the plurality of attack methods, the priorities being for specifying the first attack method performed on a priority basis from among the plurality of attack methods; and
the processor is further configured to specify, in the first game mode, one of the plurality of attack methods that is capable of executing an attack on the enemy character by the player character and that has a highest priority, based on the plurality of attack methods and the priorities stored in the memory.

6. The game apparatus according to claim 1, wherein, in the first game mode, a new positional condition is configured to be added to the conditions regarding the distance between the player character and the enemy character in response to the player character clearing a predetermined event in the game.

7. The game apparatus according to claim 1, wherein a progress of the game changes the plurality of attack methods in the first game mode.

8. The game apparatus according to claim 1, wherein the progress of the game adds an attack method to the plurality of attack methods in the first game mode.

9. The game apparatus according to claim 1, wherein a progress of the game changes an upper limit number of the plurality of attack methods in the first game mode.

10. The game apparatus according to claim 9, wherein the progress of the game increases the upper limit number of the plurality of attack methods in the first game mode.

11. The game apparatus according to claim 9, wherein the progress of the game reduces the upper limit number of the plurality of attack methods in the first game mode.

12. The game apparatus according to claim 1, further comprising:
a graphics processor that generates an attack method setting panel for display on the display device.

13. The game apparatus according to claim 1, wherein the memory further stores, for the first game mode, a positional relationship between the payer character and the enemy character in association with the plurality of attack methods.

14. The game apparatus according to claim 13, wherein the positional relationship includes a direction of the player character and the enemy character.

15. The game apparatus according to claim 1, wherein
when the attack instruction is received by the interface in the first game mode and a plurality of enemy characters is within a range of attack of the player character, the interface receives a selection instruction by the player providing a second operation instruction to the input device that selects one of the plurality of enemy characters, and
the processor specifies the first attack method based on the selected instruction.

16. The game apparatus according to claim 1, wherein
in the first game mode, each of the plurality of attack methods is performed by the player character by the player pressing a same operating button as the first operation instruction, and
in the second game mode, each of the plurality of attack methods is performed by the player character by the player pressing a plurality of buttons as the first operation instruction.

17. A game progressing method for a game in which a player character does a virtual battle with an enemy character, the player character being an operation target of a player, the game progressing method comprising:
storing, in a memory, for a first game mode, a plurality of attack methods to be performed on the enemy character by the player character and conditions regarding a distance between the player character and the enemy character such that the plurality of attack methods and the conditions are associated with each other;
storing, in the memory, for a second game mode, the plurality of attack methods to be performed on the enemy character by the player character and patterns regarding operation instructions to an input device by the player, the plurality of attack methods being associated with the patterns in the memory;
receiving an attack instruction by a first operation instruction to the input device by the player;
specifying, in the first game mode, when receiving the attack instruction, a first attack method based on the plurality of attack methods stored in the memory, the first attack method corresponding to the distance between the player character and the enemy character when the attack instruction is received;
specifying, in the second game mode, when receiving the attack instruction, a second attack method based on the plurality of attack methods stored in the memory, the second attack method corresponding to one of the patterns of the operations to the input device by the player when the attack instruction is received by the interface; and
executing an attack on the enemy character by the player character, according to one of, in the first game mode, the first attack method or, in the second game mode, the second attack method of the plurality of attack methods,
wherein a game mode is configured to be switched between the first game mode and the second game mode by a switching instruction to the input device by the player.

18. The game progressing method according to claim 17, wherein, in the first game mode, a new positional condition is configured to be added to the conditions regarding the distance between the player character and the enemy character in response to the player character clearing a predetermined event in the game.

19. A non-transitory computer-readable recording medium storing a game program that causes a computer apparatus to execute a game in which a player character does a virtual battle with an enemy character, the player character being an operation target of a player, the game program causing the computer apparatus to function as:
a memory that stores, for a first game mode, a plurality of attack methods to be performed on the enemy character by the player character and conditions regarding a distance between the player character and the enemy character such that the plurality of attack methods and the conditions are associated with each other;
the memory that stores, for a second game mode, the plurality of attack methods to be performed on the enemy character by the player character and patterns regarding operation instructions to an input device by the player, the plurality of attack methods being associated with the patterns in the memory;
an interface that receives an attack instruction by a first operation instruction to the input device by the player;

a processor that specifies, in the first game mode, when receiving the attack instruction by the interface, a first attack method based on the plurality of attack methods stored in the memory, the first attack method corresponding to the distance between the player character and the enemy character when the attack instruction is received by the interface;

the processor that specifies, in the second game mode, when receiving the attack instruction by the interface, a second attack method based on the plurality of attack methods stored in the memory, the second attack method corresponding to one of the patterns of the operations to the input device by the player when the attack instruction is received by the interface; and the processor that executes an attack on the enemy character by the player character, according to one of, in the first game mode, the first attack method or, in the second game mode, the second attack method of the plurality of attack methods, wherein a game mode is configured to be switched between the first game mode and the second game mode by a switching instruction to the input device by the player.

20. The non-transitory computer-readable recording medium according to claim 19, wherein, in the first game mode, a new positional condition is configured to be added to the conditions regarding the distance between the player character and the enemy character in response to the player character clearing a predetermined event in the game.

\* \* \* \* \*